United States Patent [19]

Horlacher et al.

[11] Patent Number: 5,068,302

[45] Date of Patent: Nov. 26, 1991

[54] POLYSILOXANE-POLYCARBONATE BLOCK COPOLYMERS BASED ON CERTAIN DIHYDROXYDIPHENYLCYCLOALKANES

[75] Inventors: Peter Horlacher, Senden; Volker Serini; Dieter Freitag, both of Krefeld; Ulrich Grigo, Kempen; Karsten-Josef Idel, Krefeld; Uwe Westeppe, Mettmann, all of Fed. Rep. of Germany

[73] Assignee: Bayer Aktiengesellschaft, Bayerwerk, Fed. Rep. of Germany

[21] Appl. No.: 564,473

[22] Filed: Aug. 8, 1990

[30] Foreign Application Priority Data

Aug. 15, 1989 [DE] Fed. Rep. of Germany ....... 3926850

[51] Int. Cl.$^5$ ............................................. C08G 77/06
[52] U.S. Cl. ......................................... 528/21; 528/26; 528/29; 528/43
[58] Field of Search .................. 528/21, 27, 43, 29, 528/33, 26

[56] References Cited

U.S. PATENT DOCUMENTS

| | | | |
|---|---|---|---|
| 3,189,662 | 6/1965 | Vaughn, Jr. .................... | 260/824 |
| 3,419,634 | 12/1968 | Vaughn, Jr. .................... | 260/824 |
| 4,495,345 | 1/1985 | Kawakami tal. ................ | 528/43 |
| 4,569,970 | 2/1986 | Paul et al. ....................... | 525/67 |
| 4,584,360 | 4/1986 | Paul et al. ....................... | 528/14 |
| 4,732,949 | 3/1988 | Paul et al. ....................... | 528/29 |
| 4,782,115 | 11/1988 | Paul et al. ....................... | 525/67 |

Primary Examiner—Melvyn I. Marquis
Assistant Examiner—Margaret W. Glass
Attorney, Agent, or Firm—Joseph C. Gil; Aron Preis

[57] ABSTRACT

Polydiorganosiloxane-polycarbonate block copolymers based on dihydrodiphenylcycloalkanes corresponding to formula (I)

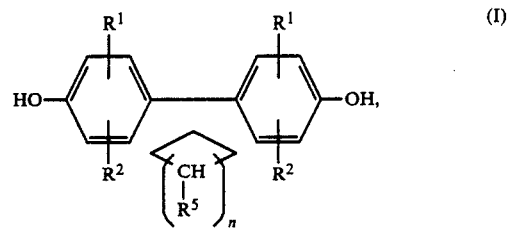

in which
$R^1$, $R^2$ independently of one another represent hydrogen, halogen, preferably chlorine or bromine, $C_{1-8}$ alkyl, $C_{5-6}$ cycloalkyl, $C_{6-10}$ aryl and $C_{7-12}$ aralkyl, preferably phenyl-$C_{1-4}$-alkyl, more especially benzyl, n=2 or 3 and
the substituents $R^5$ independently of one another are hydrogen or $C_{1-12}$ alkyl, with the proviso that at least one of the substituents $R^5$ is not hydrogen, having an average molecular weight $M_w$ (weight average) in the range from 10,000 to 300,000 (as measured by ultracentrifugation or scattered light measurement) and a content of carbonate containing dihydroxydiphenylcycloalkanes of formula I and, optionally, other diphenols in co-condensed form of from 75% by weight of 99.0% by weight and a content of polydiorganosiloxane having a degree of polymerization Pn of 5 to 300 of from 25% by weight of 1% by weight.

4 Claims, No Drawings

POLYSILOXANE-POLYCARBONATE BLOCK COPOLYMERS BASED ON CERTAIN DIHYDROXYDIPHENYLCYCLOALKANES

This invention relates to thermoplastic polydiorganosiloxane-polycarbonate block copolymers based on dihydroxydiphenylcycloalkanes corresponding to formula (I)

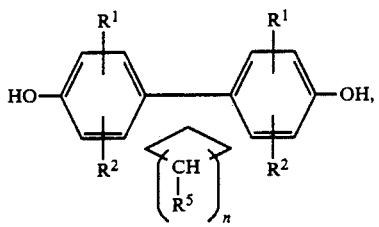

in which
- $R^1$, $R^2$, independently of one another represent hydrogen, halogen, preferably chlorine or bromine, $C_{1-8}$ alkyl, $C_{5-6}$ cycloalkyl, $C_{6-10}$ aryl and $C_{7-12}$ aralkyl, preferably phenyl-$C_{1-4}$-alkyl, more especially benzyl,
- n=2 or 3 and
- the substituents $R^5$ independently of one another are hydrogen or $C_{1-12}$ alkyl, with the proviso that at least one of the substituents $R^5$ is not hydrogen.

$R^5$ is preferably a linear $C_{1-5}$ alkyl radical or a branched $C_{3-8}$ alkyl radical.

The polydiorganosiloxane-polycarbonate block copolymers according to the invention are distinguished by heat resistance, strength, high UV stability and toughness.

Polydiorganosiloxane-polycarbonate block copolymers are basically known (cf. U.S. Pat. No. 3,189,662 and 3,419,634; DE-OS 3 334 782 and 3 506 472; EP-A 122 535 and 135 794).

The thermoplastic polydiorganosiloxane-polycarbonate block copolymers according to the invention have an average molecular weight $M_w$ (weight average) in the range from 10,000 to 300,000 and preferably in the range from about 15,000 to 80,000 (as determined in known manner by ultra-centrifugation or scattered light measurement), a polycarbonate content of from 75% by weight to 99.0% by weight and a polydiorganosiloxane content of from 25% by weight to 1.0% by weight. They may be prepared from
- a) α,ω-bishydroxyaryloxy polydiorganosiloxanes having a degree of polymerization Pn of from 5 to 300 and preferably from 20 to 160, preferably those corresponding to formula (II),
- b) diphenols corresponding to formula (I) (5 to 100 mol-% and preferably 10 to 80 mol-%) and, optionally, diphenols corresponding to formula (III) (0 to 95% by weight and preferably 90 to 20% by weight), optionally
- c) chain terminators and optionally
- d) branching agents, by two-phase interfacial polycondensation with carbonate donors.

Suitable α,ω-bishydroxyaryloxy polydiorganosiloxanes a) are known, for example, from U.S. Pat. No. 3,419,634.

Preferred α,ω-bishydroxyaryloxy polydiorganosiloxanes are those corresponding to formula (II)

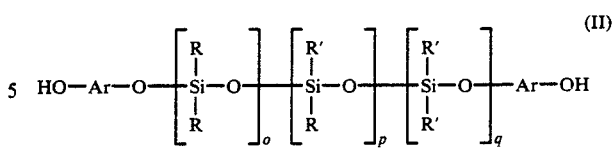

in which
- Ar is the residue of a diphenol corresponding to formula (I) or formula (III) without the two hydroxyl groups and
- R and R' represent linear alkyl, branched alkyl, alkenyl, halogenated linear alkyl, halogenated branched alkyl, aryl or halogenated aryl, preferably methyl, and
- o, p, q are integers for which n=o+p+q=5 to 300 and preferably 20 to 160.

In formula (II), the substituents R and R' are independent of one another and are preferably $C_{1-20}$ alkyl, $C_{2-6}$ alkyenyl, $C_{6-14}$ aryl. Halogenated means partly or completely chlorinated, brominated or fluorinated. More preferably, R and R' represent methyl, ethyl, propyl, n-butyl, tert.-butyl, vinyl, phenyl, napthtyl, chloromethyl, trifluoropropyl, perfluorobutyl and perfluorooctyl.

Diphenols (b) are diphenols corresponding to formula (I) above and to formula (III) below

in which
- Ar° represent identical or different arylene radicals preferably containing 6 to 30 carbon atoms.

Examples of diphenols corresponding to formula (III) are hydroquinone, resorcinol, dihydroxydiphenyls, bis-(hydroxyphenyl)-alkanes, bis-(hydroxyphenyl)-cycloalkanes except those of formula (I), bis-(hydroxyphenyl)-sulfides, bis-(hydroxyphenyl)-ethers, bis-(hydroxyphenyl)-sulfoxides, bis-(hydroxyphenyl)-sulfones and α,ω-bis-(hydroxyphenyl)-diisopropyl benzenes and also corresponding nucleus-alkylated and nucleus-halogenated compounds. These and other suitable diphenols are described, for example, in U.S. Pat. Nos. 3,028,365 and 2,999,846 and in DE-OS 1 570 703, 2 036 052, 2 063 050, 2 211 957, in FR-PS 561 518 and in H. Schnell "Chemistry and Physics of Polycarbonates", Interscience Publishers, New York, 1964.

Preferred diphenols of formula (III) are

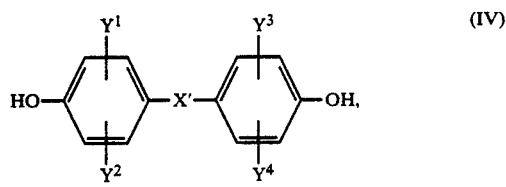

in which
X' is a single bond, —$CH_2$—, —$C(CH_3)_2$—, —O—, —S—,

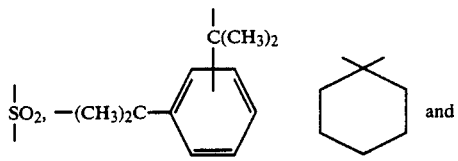

$Y^1$ to $Y^4$ may be the same or different and represent hydrogen, $C_{1-4}$ alkyl, preferably methyl, or halogen, preferably chlorine or bromine.

Preferred diphenols are 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl)-sulfide.

It is possible to use one or more diphenols corresponding to formula (I) and, optionally, one or more diphenols corresponding to formula (III).

Diphenols corresponding to formula (I) may be prepared in known manner by condensation of phenols corresponding to formula (V)

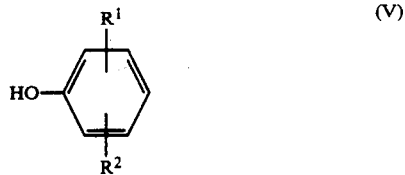

and ketones corresponding to formula (VI)

In formulae (V) and (VI), X, $R^1$, $R^2$, $R^3R^4$, $R^5$ and n are as defined for formula (I).

Suitable chain terminators c) are aromatic compounds containing only one functional group, such as aromatic acid halides or phenols, more especially the usual phenols, such as p-tert.-butylphenol, p-chlorophenol, 2,4,6-tribromophenol and phenol, which may be used in quantities determined by the desired molecular weight of the block copolymers. Particularly preferred chain terminators are phenols corresponding to formula (VII)

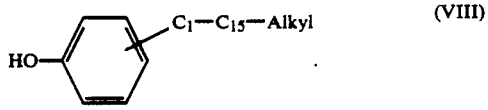

In general, the chain terminators are used in quantities of from 0.5 mol-% to 10.0 mol-%, based on the diphenols used.

Suitable branching agents d) are those containing three or more than three functional groups, particularly those containing three or more than three phenolic hydroxyl groups; they may be used in the usual quantities of 0.05 to 2 mol-%, based on the diphenols incorporated.

Some of the compounds containing three or more than three phenolic hydroxyl groups which may be used in accordance with the invention are 2,4-bis-(4-hydroxyphenyl isopropyl)-phenol, 2,6-bis-(2'-hydroxy-5'-methylbenzyl)-4-methylphenol, 2-(4-hydroxyphenyl)-2-(2,4-dihydroxyphenyl)-propane and 1,4-bis-(4,4'-dihydroxytriphenylmethyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole and also 3,3-bis-(4-hydroxy-3-methylphenyl)-2-oxo-2,3-dihydroindole.

Suitable organic solvents for the two-phase interfacial polycondensation are the known solvents for the production of aromatic polycarbonates, such as for example methylene chloride or chlorobenzene.

The quantities in which they are used are preferably selected so that the two-phase interfacial polycondensation takes place in 5 to 20% and preferably 10 to 15% solution in the organic solvent.

Suitable basic compounds for the formation of the aqueous alkaline phase are solutions of LiOH, NaOH, KOH, $Ca(OH)_2$ and/or $Ba(OH)_2$ in water.

In the two-phase interfacial polycondensation, the volumes of aqueous-alkaline phase and total organic phase are preferably equal.

The pH value of the aqueous phase during the reaction is in the range from 9 to 14 and preferably in the range from 12 to 13.

Suitable catalysts for the two-phase interfacial polycondensation are the tertiary aliphatic amines typically used for the synthesis of polycarbonates, such as trimethylamine, triethylamine, n-tripropylamine, n-tributylamine or N-ethyl piperidine; quaternary ammonium salts, such as tetrabutyl ammonium bromide for example, may also be used. Depending on the diphenol used, the catalyst may be used in a quantity of 0.2 to 5 mol-% and, for tetramethyl-substituted diphenols, in a quantity of from 5 to 10 mol-%, based in either case on the total quantity of diphenols b).

The quantities of diphenol b) and α,ω-bishydroxyaryloxy polydiorganosiloxane a) are determined by the desired content of poly(diorganosiloxane) units in the block copolymer. The reaction of the reactants is normally quantitative.

In the two-phase interfacial polycondensation, the α,ω-bishydroxyaryloxy polydiorganosiloxanes and the chain terminators may be added together with the diphenols b) before the introduction of phosgene or separately during or after the introduction of phosgene, but in either case before addition of the polycondensation catalyst.

The "carbonate donors" used for the two-phase interfacial polycondensation are, in known manner, carbonic acid halides, particularly carbonic acid chlorides, such as phosgene, $COBr_2$, or the bischlorocarbonic acid esters of diphenols. The carbonate donors are used in appropriate quantities, less than ½ mol diphenol being used per mol halocarbonic acid group.

The polydiorganosiloxane-polycarbonate block copolymers may be separated from the reaction mixtures as aromatic polycarbonates. To this end, the organic phase containing the block copolymer in dissolved form is separated off, washed and the block copolymer subsequently isolated by concentration of the solution by evaporation, an evaporation extruder preferably being used as the final stage of the working-up process.

The thermoplastic block copolymers according to the invention may contain stabilizers which considerably increase their stability. For modification, it is possible for example to add carbon black, kieselguhr, kaolin, clays, $CaF_2$, $CaCO_3$, aluminium oxides, glass fibers and inorganic pigments both as fillers and as nucleating agents. They may also contain the mold release agents typically used for polycarbonates, such as glycerol stearate for example.

The polydiorganosiloxane-polycarbonate block copolymers according to the invention are thermoplastic molding compounds which may be used for any applications where their key properties of heat resistance, strength, toughness and UV stability are required.

The polydiorganosiloxane-polycarbonate block copolymers according to the invention may also form thermoplastic molding compounds with other siloxane-free thermoplastic polycarbonates based on diphenols corresponding to formulae (I) and (III). These polycarbonates have average molecular weights $M_w$ (weight average as determined by ultracentrifugation or scattered light measurement) in the range from 10,000 to 300,000. In this case, too, the content of polydiorganosiloxane structural units in the mixture is from 25 to 1.0% by weight, based on the total weight of the mixture.

Polydiorganosiloxane-polycarbonate block copolymers containing more than 25% by weight and preferably from 40 to 60% by weight polydiorganosiloxane structural units and having a weight average molecular weight in the range from 15,000 to 80,000 can also be used for the preparation of the above mixtures with siloxane-free polycarbonates.

Polydiorganosiloxane-polycarbonate block copolymers such as these may be prepared by suitably selecting the quantity of starting products.

The polydiorganosiloxane-polycarbonate block copolymers according to the invention may be used for the production of moldings of any kind by known methods. More particularly, moldings may be produced by extrusion or injection molding.

Examples of moldings which can be produced from the block copolymers according to the invention are bodywork parts and housing parts, for example for electrical appliances and apparatus, such as domestic appliances, building panels and films.

The relative solution viscosities were measured in dichloromethane at 25° C. and at a concentration of 5 g/l solution.

Notched impact strength was determined in accordance with ISO 180 using flat test specimens (80 mm×10 mm×4 mm) while heat resistance was determined by the Vicat (B) method according to DIN 53 460/ISO 360.

EXAMPLE 1

26.5 g (0.094 mol) 1,1-bis-(4-hydroxyphenyl)-3-methyl cyclohexane, 6.75 g (0.17 mol) NaOH and 385 g water are dissolved while stirring in an inert gas atmosphere. A solution of 1.67 g of the polydimethylsiloxane block (Pn=71) containing terminal bisphenol A groups (=5% by weight $SiMe_2O$) and 0.22 g (2.3 mmol) phenol in 190 ml methylene chloride is then added. 15.8 g (0.16 mol) phosgene were introduced into the thoroughly stirred solution at pH 12 to 13 and at 21° to 25° C. 0.14 ml ethyl piperidine is then added and the mixture stirred for 45 minutes. The bisphenolate-free aqueous phase is separated off and the organic phase, after acidification with phosphoric acid, is washed with water until neutral and freed from the solvent.

$\eta_{rel}$: 1.279
Tg (DSC): 211.5° C.

EXAMPLE 2

5.33 g (0.0019 mol) 1,1-bis-(4-hydroxyphenyl)-3-methyl cyclohexane, 17.24 g (0.076 mol) bisphenol A, 6.75 g (0.17 mol) NaOH and 385 g water are dissolved while stirring in an inert gas atmosphere. A solution of 1.37 g of the polydimethylsiloxane block (Pn=71) containing terminal bisphenol A groups (=5% by weight $SiMe_2O$) and 0.23 g (2.5 mmol) phenol in 190 ml methylene chloride is then added. 15.8 g (0.16 mol) phosgene are introduced into the thoroughly stirred solution at pH 12 to 13 and at 21° to 25° C. 0.14 ml ethyl piperidine is then added and the mixture stirred for 45 minutes. The bisphenolate-free aqueous phase is separated off, the organic phase, after acidification with phosphoric acid, is washed with water until neutral and then freed from the solvent.

$\eta_{rel}$: 1.307
Vicat: 159° C.
Notched impact strength (ISO 180) $a_k$ (kJ/m$^2$) at 23° C.: 25.1

EXAMPLE 3

35.72 g (0.094 mol) 1,1-bis-(4-hydroxyphenyl)-4-(1,1,3,3-tetramethylbutyl)-cyclohexane, 6.75 g (0.17 mol) NaOH and 385 g water are dissolved while stirring in an inert gas atmosphere. A solution of 2.20 g of the polydimethylsiloxane block (Pn=71) containing terminal bisphenol A groups (=5% by weight $SiMe_2O$) and 0.17 g (1.8 mmol) phenol in 190 ml methylene chloride is then added. 15.8 g (0.16 mol) phosgene are introduced into the thoroughly stirred solution at pH 12 to 13 and at 21° to 25° C. 0.14 ml ethyl piperidine is then added and the mixture stirred for 45 minutes. The bisphenolate-free aqueous phase is separated off, the organic phase, after acidification with phosphoric acid, is washed with water until neutral and then freed from the solvent.

$\eta_{rel}$: 1.268
Tg (DSC): 177° C.

What is claimed is:
1. A thermoplastic molding composition comprising a polydiorganosiloxane-polycarbonate block copolymer having a weight average molecular weight of about 10,000 to 300,000 as measured by ultracentrifugation or scattered light based on
   (i) a α,ω-bishydroxyaryloxy polysiloxane having a degree of polymerization of 5 to 300 and
   (ii) at least one dihydroxydiphenylcycloalkane corresponding to

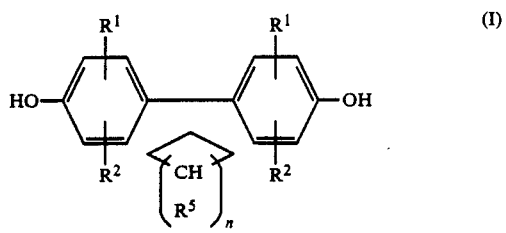

in which $R^1$ and $R^2$ independently of one another represent at least one member selected from the group consisting of hydrogen atom, a halogen atom $C_{1-8}$ alkyl, $C_{5-6}$ cycloalkyl, $C_{6-10}$ aryl and $C_{7-12}$ aralkyl radicals, n=2 or 3 and the substituents $R^5$ independently of one another are hydrogen or $C_{1-12}$ alkyl, characterized in that at least one of the substituents $R^5$ is not hydrogen, and in that the content of its polydiorganosiloxane is about 1 to 25 percent relative to the weight of said copolymer.

2. The composition of claim 1 wherein said halogen is either chlorine or bromine.

3. The composition of claim 1 wherein at least one of said $R^1$ and $R^2$ represents phenyl-$C_{1-4}$-alkyl.

4. The composition of claim 3 wherein at least one of said $R^1$ and $R^2$ represents benzyl.

* * * * *